US012558892B2

(12) United States Patent
Koyata et al.

(10) Patent No.: US 12,558,892 B2
(45) Date of Patent: Feb. 24, 2026

(54) LIQUID EJECTION HEAD

(71) Applicant: RISO Technologies Corporation, Tokyo (JP)

(72) Inventors: Minoru Koyata, Mishima Shizuoka (JP); Takashi Tozuka, Sunto Shizuoka (JP)

(73) Assignee: RISO Technologies Corporation, Tokyo (JP)

(*) Notice: Subject to any disclaimer, the term of this patent is extended or adjusted under 35 U.S.C. 154(b) by 128 days.

(21) Appl. No.: 18/322,992

(22) Filed: May 24, 2023

(65) Prior Publication Data

US 2024/0009997 A1 Jan. 11, 2024

(30) Foreign Application Priority Data

Jul. 8, 2022 (JP) ................................ 2022-110563

(51) Int. Cl.
*B41J 2/14* (2006.01)

(52) U.S. Cl.
CPC .. *B41J 2/14233* (2013.01); *B41J 2002/14419* (2013.01); *B41J 2202/12* (2013.01)

(58) Field of Classification Search
CPC .......... B41J 2/14233; B41J 2002/14419; B41J 2202/12; B41J 2202/08; B41J 2/14209; B41J 2002/14491; B41J 2/14201
See application file for complete search history.

(56) References Cited

U.S. PATENT DOCUMENTS

| | | | | |
|---|---|---|---|---|
| 10,513,116 | B2 | 12/2019 | Kubota | |
| 2013/0050338 | A1 | 2/2013 | Shimosato | |
| 2014/0160208 | A1* | 6/2014 | Hoshino | B41J 2/1609 347/68 |

(Continued)

FOREIGN PATENT DOCUMENTS

| | | | |
|---|---|---|---|
| CN | 108382070 | A | 8/2018 |
| EP | 3357695 | A1 | 8/2018 |

(Continued)

OTHER PUBLICATIONS

Kubota et al., "Liquid Ejecting Head and Liquid Ejecting Apparatus" (EP 3357695 A1), Aug. 8, 2018, [Paragraphs 0044 , 0053-0059, 0067-0070, 0073-0077, 0080, 0082-0085, and 0138-0139] (Year: 2018).*

(Continued)

*Primary Examiner* — Lisa Solomon
(74) *Attorney, Agent, or Firm* — Kim & Stewart LLP

(57) ABSTRACT

According to one embodiment, a liquid ejection head includes a substrate and an actuator on a first surface side of the substrate. The actuator has pressure chambers and air chambers. Each pressure chamber is connected to an opening in the substrate extending from a second surface side of the substrate to the pressure chamber. A manifold is on the second surface side of the substrate and connected to the opening in the substrate. A common electrode includes a portion on the actuator, a portion on a surface of the substrate, a portion on another surface of the substrate, a portion on a sidewall surface of the opening, and a portion on a side surface of the substrate. Individual electrodes each have a portion on a surface of the actuator and a portion on a surface of the substrate.

11 Claims, 8 Drawing Sheets

(56) References Cited

U.S. PATENT DOCUMENTS

2023/0087927 A1 3/2023 Tozuka

FOREIGN PATENT DOCUMENTS

EP 3357695 B1 * 7/2019 ................ B41J 2/14
JP 2018122551 A 8/2018

OTHER PUBLICATIONS

Extended European Search Report dated Nov. 9, 2023, mailed in counterpart European Application No. 23179877.8, 8 pages.
U.S. Appl. No. 18/324,870, filed May 26, 2023.
Chinese Office Action dated Dec. 25, 2025, mailed in counterpart Chinese Application No. 202310395771.4, 13 pages.

* cited by examiner

LIQUID EJECTION HEAD

CROSS-REFERENCE TO RELATED APPLICATION

This application is based upon and claims the benefit of priority from Japanese Patent Application No. 2022-110563, filed on Jul. 8, 2022, the entire contents of which are incorporated herein by reference.

FIELD

Embodiments described herein relate generally to a liquid ejection head.

BACKGROUND

A liquid ejection head that includes an actuator in which a plurality of partition walls are formed at predetermined intervals and pressure chambers are formed between the partition walls is known. This liquid ejection head can use an independent drive structure including pressure chambers (for ejecting a liquid from nozzles) and air chambers (not ejecting the liquid) in order to speed up the ejection of the liquid.

In a liquid ejection head having the independent drive structure, electrodes of the pressure chambers may be bundled to form a common electrode, and electrodes of the air chambers may be drawn out as individual electrodes on a side opposite of the common electrode. For example, the common electrode is formed on a front surface of a substrate, an inner surface of a supply hole, and a back surface of the substrate, and a coating layer is formed on the front surface of the substrate.

In such a liquid ejection head, if the ink (liquid) contains a component that dissolves the electrode, the portion of the common electrode on the back surface of the substrate may eventually be eroded and the electrodes on the front surface and the back surface may be disconnected or resistance of the common electrode increases. In this case, a difference in drive waveform for liquid ejection between an end portion and a central portion within a row of nozzles may be caused, and print quality such as dot diameter and linearity deteriorates.

DETAILED DESCRIPTION

Embodiments provide a liquid ejection head that can provide high print quality in liquid ejection apparatus.

In general, according to one embodiment, a liquid ejection head includes a substrate, an actuator, a manifold, a common electrode, individual electrodes, and a coating layer. The actuator is on a first surface side of the substrate. The actuator includes a plurality of pressure chambers and a plurality of air chambers. Each air chamber is between an otherwise adjacent pair of pressure chambers in the plurality of pressure chambers. Each pressure chamber is connected to an opening in the substrate extending from a second surface side of the substrate to the pressure chamber. The manifold is on the second surface side of the substrate and connected to the opening in the substrate. The common electrode includes a portion on a front surface of the actuator, a portion on a first surface of the substrate on the first surface side of the substrate, a portion on a second surface on the second surface side of the substrate, a portion on an inner sidewall surface of the opening, and a portion on a side surface of the substrate. The individual electrodes each include a portion on the front surface of the actuator and a portion on the first surface of the substrate. The coating layer is on the first surface side of the substrate and covers at least a part of the first surface of the substrate.

Figure 1:
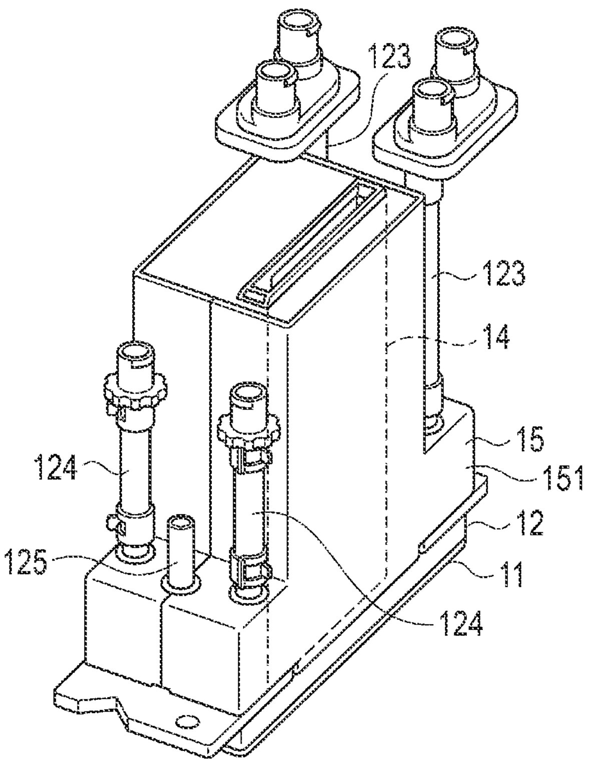
FIG. 1 is a perspective view illustrating a configuration of a liquid ejection head according to a first embodiment.
Figure 2:
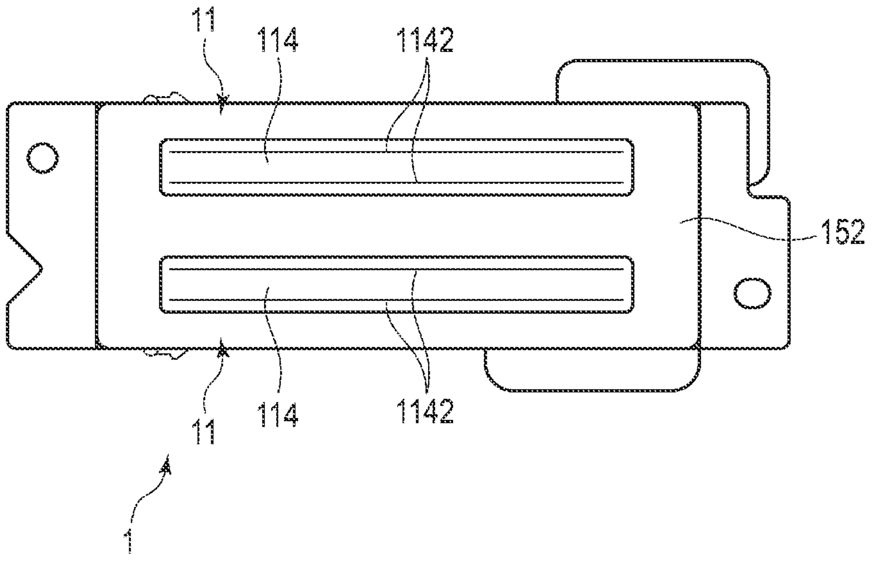
FIG. 2 is a bottom view illustrating a liquid ejection head according to a first embodiment.
Figure 3:
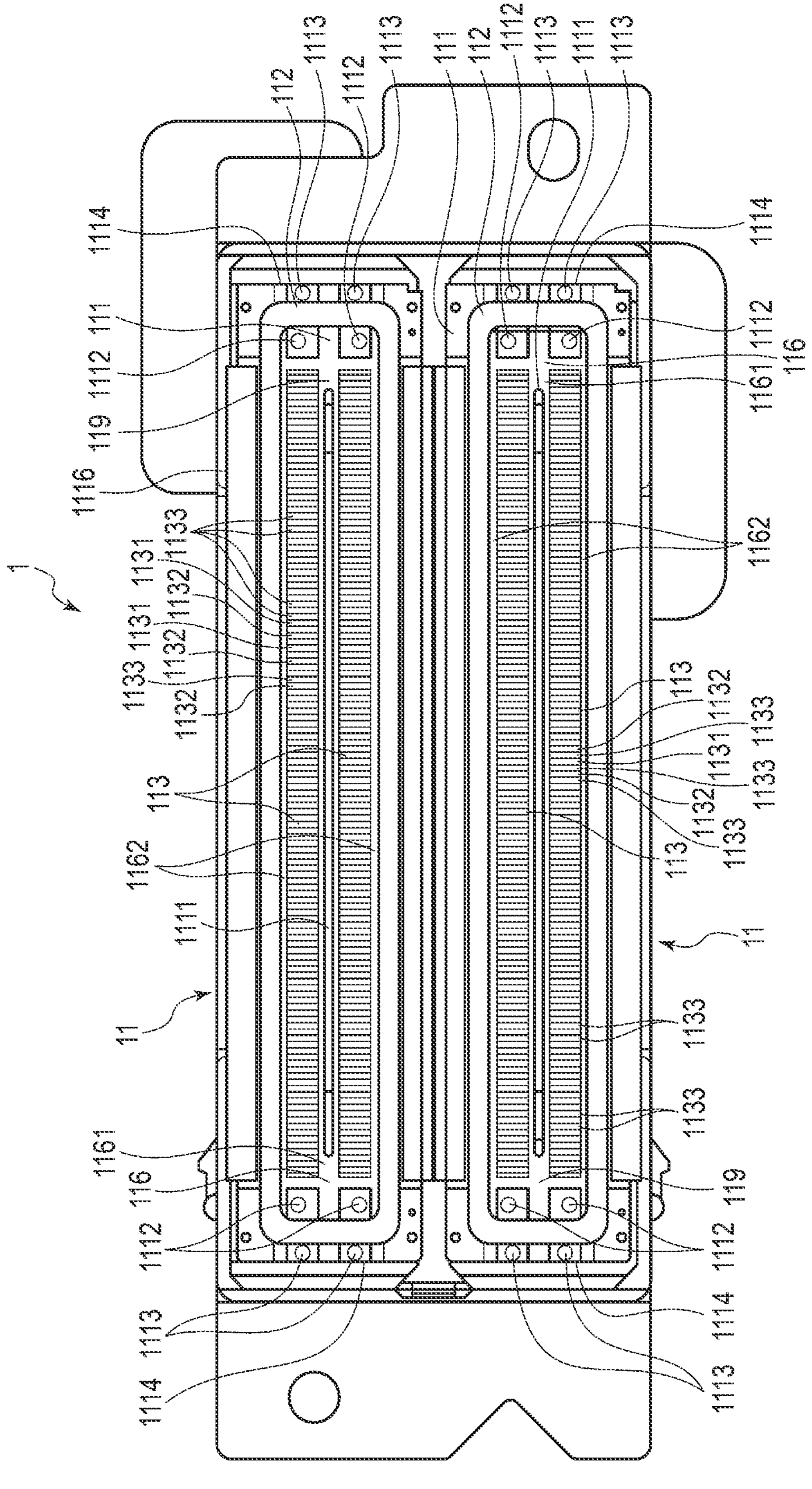
FIG. 3 is a bottom view illustrating aspects of a liquid ejection head with a part thereof omitted.
Figure 4:
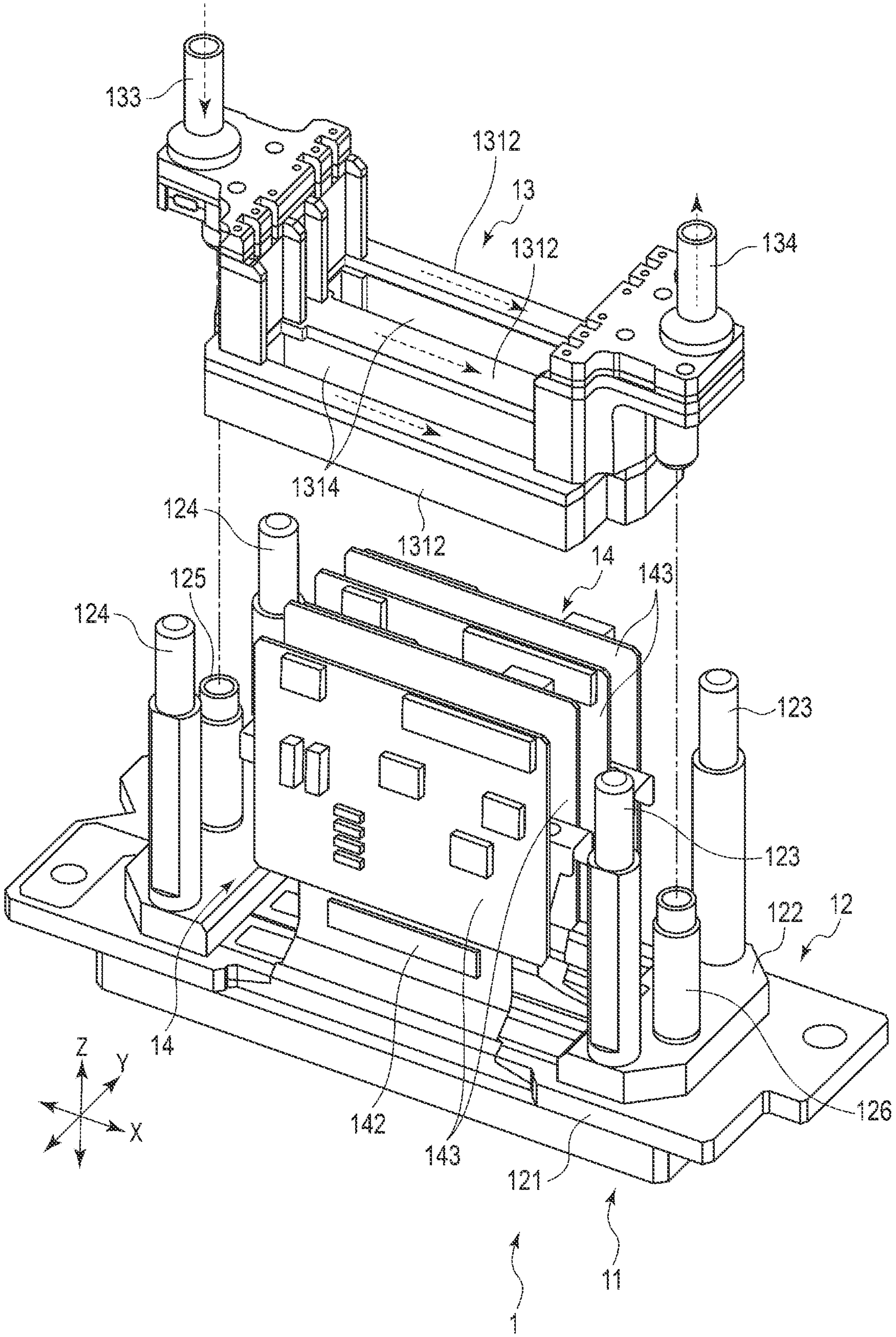
FIG. 4 is a perspective view illustrating a configuration of a head body.
Figure 5:
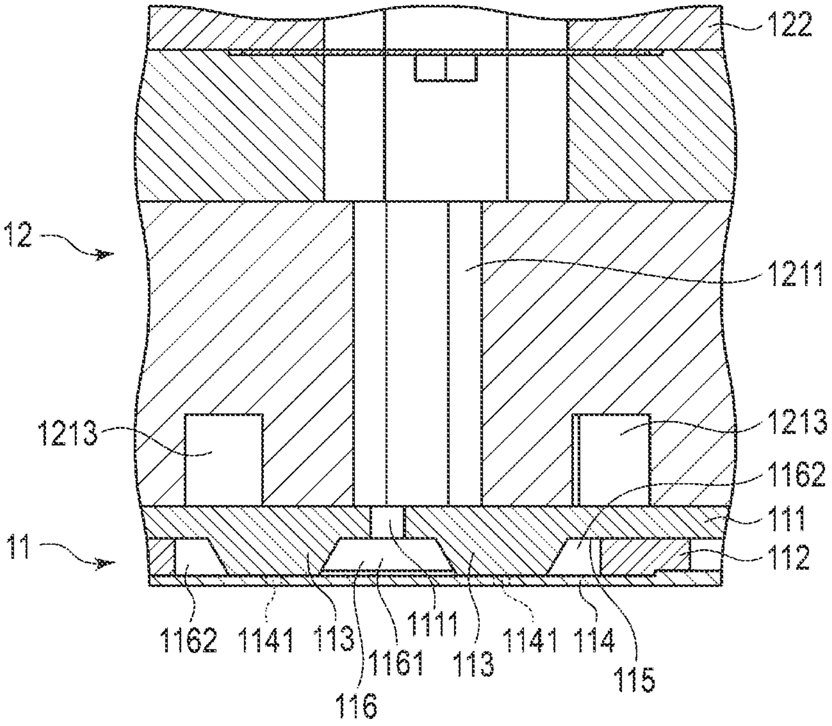
FIG. 5 is a cross-sectional view of a head body.
Figure 6:
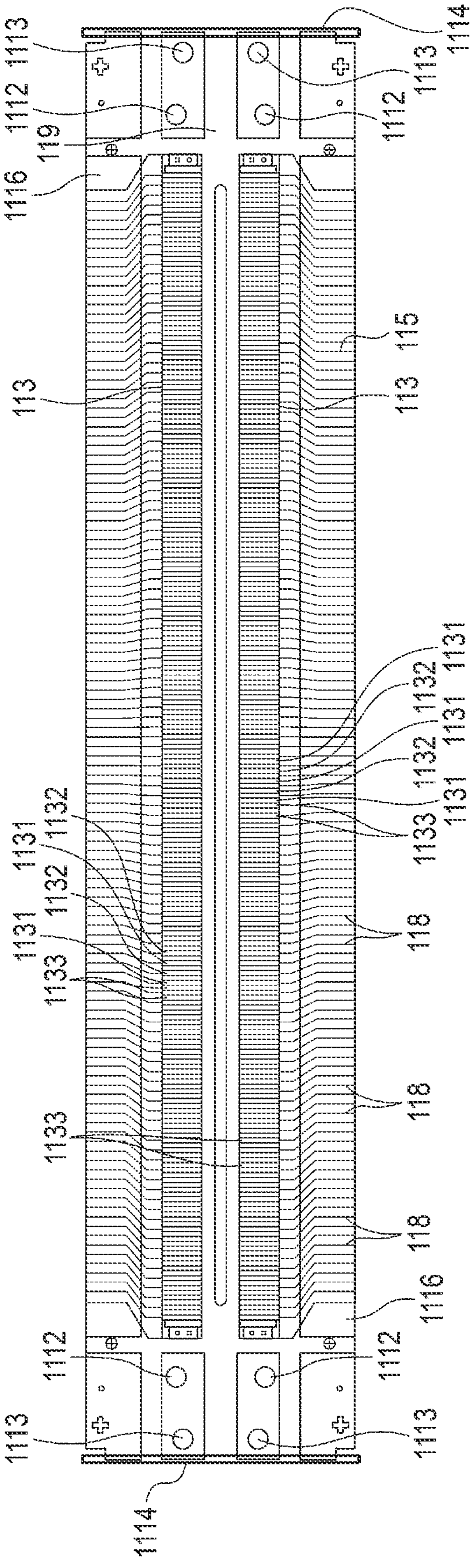
FIG. 6 is a plan view of a head body.
Figure 7:
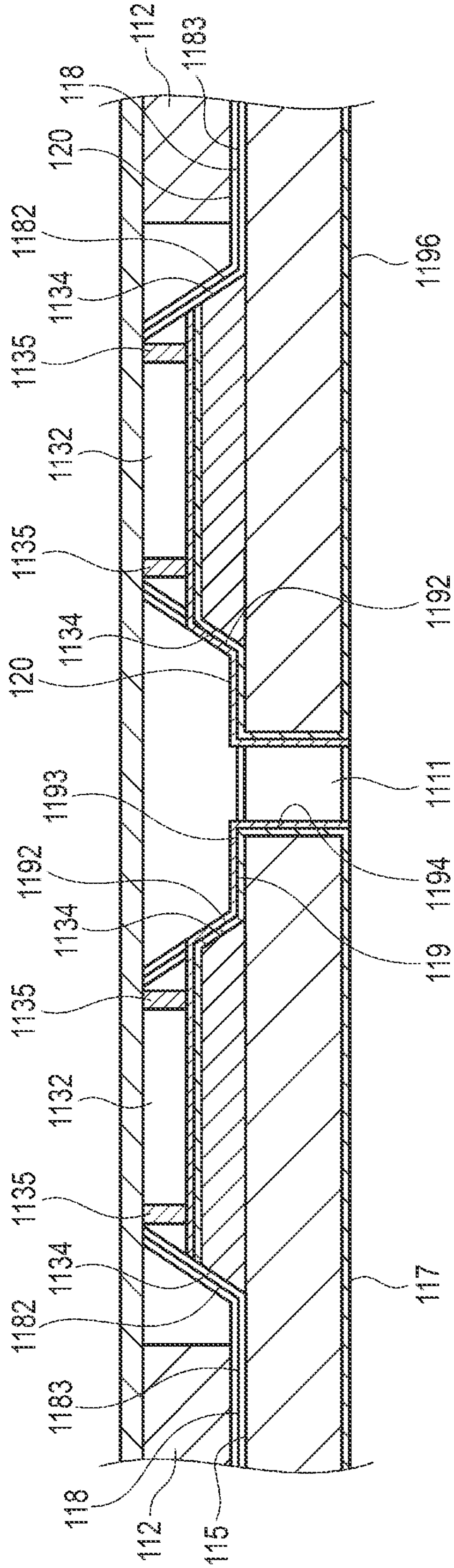
FIGS. 7-9 are cross-sectional views illustrating aspects of the configuration of a head body.
Figure 8:
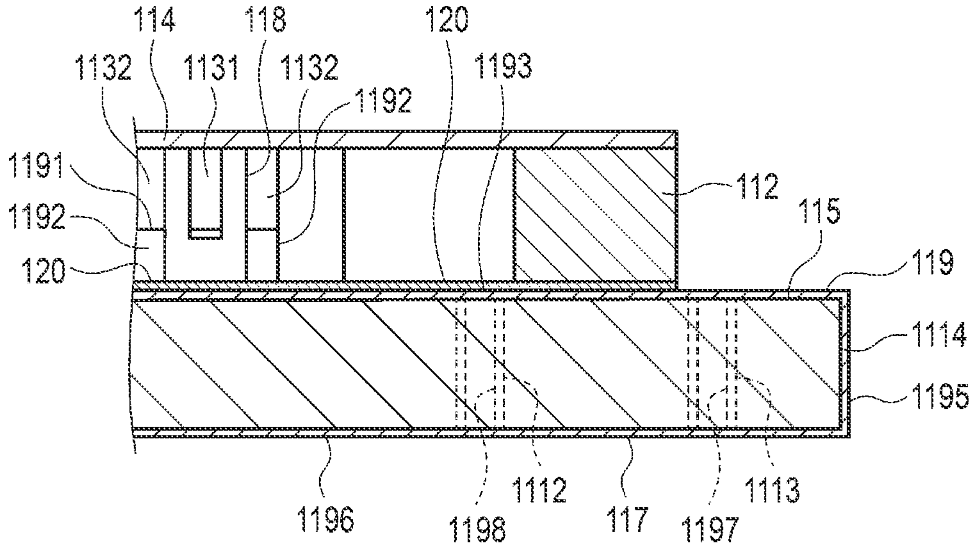
Figure 9:
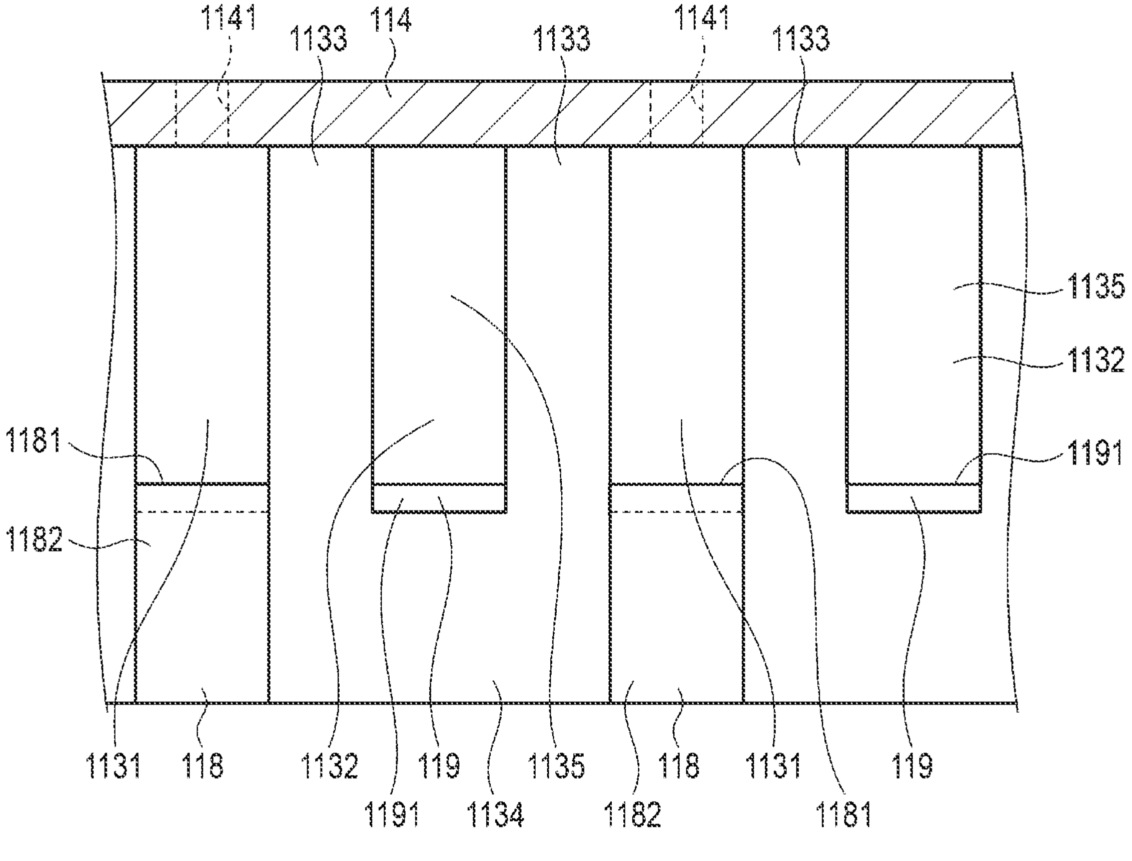
Figure 10:
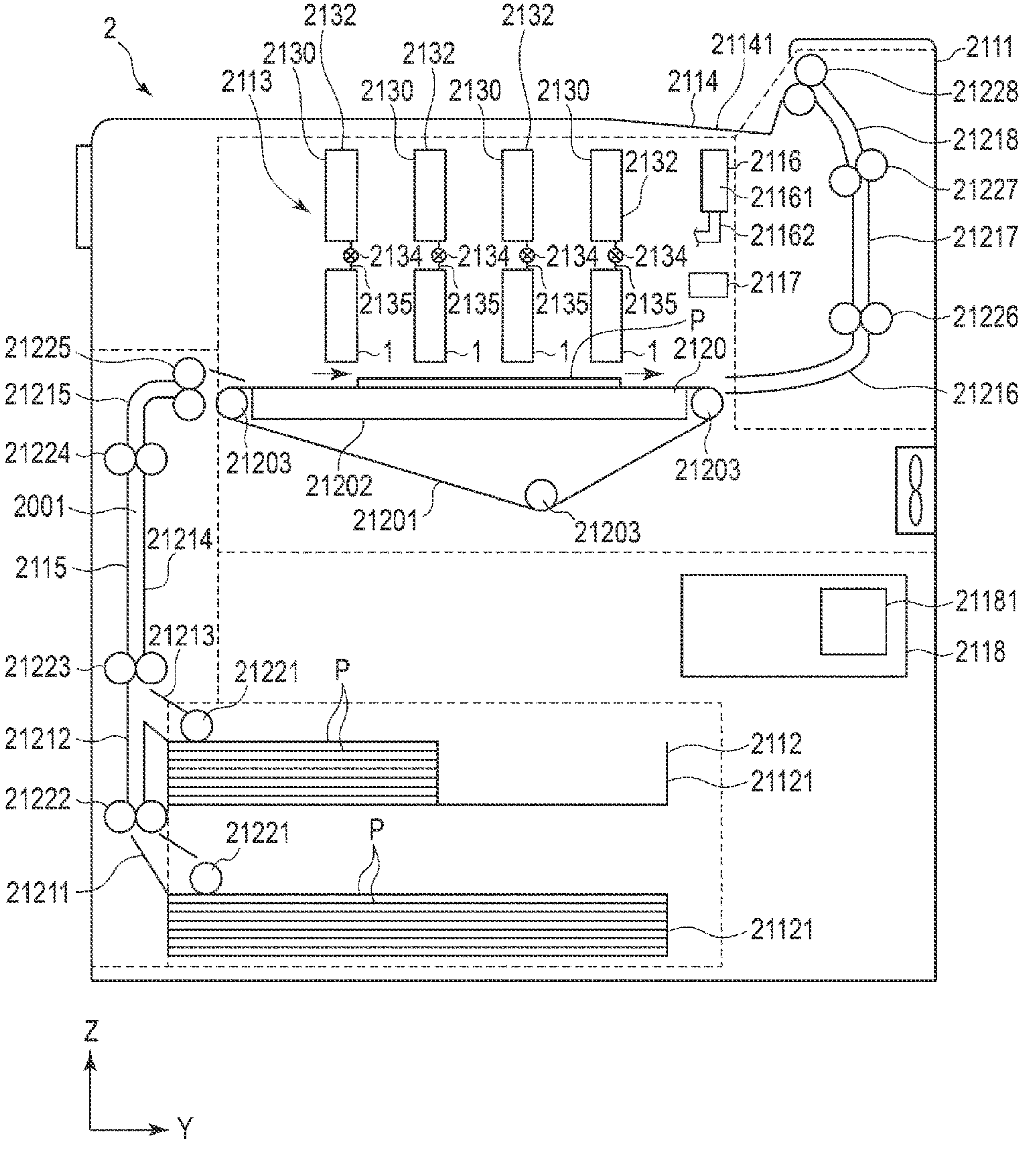
FIG. 10 is an explanatory diagram illustrating a configuration of a liquid ejection apparatus according to a first embodiment.

A liquid ejection head 1 according to a first embodiment and a liquid ejection apparatus 2 using the liquid ejection head 1 will be described below with reference to the drawings. FIG. 1 is a perspective view illustrating a configuration of the liquid ejection head 1 according to the first embodiment, and FIG. 2 is a bottom view illustrating the configuration of the liquid ejection head 1. FIG. 3 is a bottom view illustrating the configuration of the liquid ejection head 1 with a nozzle plate 114 omitted. FIG. 4 is a perspective view illustrating a configuration of a head body 11 of the liquid ejection head 1, and FIG. 5 is a cross-sectional view illustrating the configuration of the head body 11. FIG. 6 is a plan view illustrating a configuration of a substrate 111, an actuator 113, a plurality of individual electrodes 118, and a common electrode 119 of the head body 11. FIG. 7 is a cross-sectional view illustrating the configuration of the substrate 111, the actuator 113, the plurality of individual electrodes 118, and the common electrode 119 of the head body 11. FIG. 8 is a cross-sectional view illustrating the configuration of the substrate 111, the actuator 113, and the common electrode 119 of the head body 11. FIG. 9 is a cross-sectional view illustrating the configuration of the actuator 113, the plurality of individual electrodes 118, and the common electrode 119 of the head body 11. FIG. 10 is an explanatory diagram illustrating a configuration of the liquid ejection apparatus 2 using the liquid ejection head 1.

In each figure, for the sake of explanation, the configuration may be enlarged, reduced, or omitted as appropriate. In description of this example embodiment, the directions will be described such that a parallel direction of nozzles 1141 and pressure chambers 1131 of the liquid ejection head 1 is along the X-axis, an extending direction of the pressure chambers 1131 is along the Y-axis, and a liquid ejection direction is along the Z-axis. Such description is non-limiting and used only for convenience of explanation.

The liquid ejection head 1 is, for example, a shear mode inkjet head provided in an liquid ejection apparatus 2, such as an inkjet recording apparatus illustrated in FIG. 10. The liquid ejection head 1 has, for example, an independent drive structure in which the pressure chambers 1131 and air chambers 1132 are alternately provided. The liquid ejection head 1 is provided in a head unit 2130 including a supply tank 2132. The supply tank 2132 may be considered to be a liquid containing unit provided in the liquid ejection apparatus 2.

The liquid ejection head 1 is supplied with ink from the supply tank 2132. The liquid ejection head 1 may be a non-circulation type head in which ink is not circulated or a circulation type head in which ink is circulated. In this example embodiment, the liquid ejection head 1 will be described as a non-circulation type head. The liquid ejection head 1 is also connected to a cooling apparatus 2116 provided in the liquid ejection apparatus 2, and is supplied with cooling liquid (e.g., cooling water) for controlling the temperature of ink.

As illustrated in FIGS. 1 to 4, the liquid ejection head 1 includes the head body 11, a manifold unit 12, a cooling channel unit 13, a circuit board 14, and a cover 15. The liquid ejection head 1 in this example is a side shooter type four-row integrated structure head including two sets of head bodies 11 each having a pair of actuators 113.

The head body 11 ejects liquid. As illustrated in FIGS. 3 to 9, the head body 11 includes the substrate 111, a frame 112, the actuators 113 (including pressure chambers 1131 and air chambers 1132), and the nozzle plate 114.

The head body 11 includes a common liquid chamber 116 that connects to the plurality of pressure chambers 1131 of each actuator 113. A primary side of the plurality of pressure chambers 1131 is considered to be the upstream side of the plurality of pressure chambers 1131 in a direction in which the liquid flows. A secondary side of the plurality of pressure chambers 1131 is considered to be the downstream side of the plurality of pressure chambers 1131 in the direction in which the liquid flows.

The head body 11 includes individual electrodes 118 that respectively drive the individual pressure chambers 1131 and one or more common electrodes 119 for simultaneously driving pressure chambers 1131.

In this embodiment, an example in which the head body 11 comprises two actuators 113 and a common liquid chamber 116 comprises one first common liquid chamber 1161 and two second common liquid chambers 1162 will be described. The common liquid chamber 116 includes the first common liquid chamber 1161 connected to the openings (inlets of the pressure chambers 1131) on the primary side of the plurality of pressure chambers 1131, and the second common liquid chambers 1162 connected to the openings (outlets of the pressure chambers 1131) on the secondary side of the plurality of pressure chambers 1131.

The substrate 111 is made of, for example, a ceramic material such as alumina, and is formed in a rectangular plate shape. The substrate 111 has a front surface 115, which is polished surface and a back surface 117. The substrate 111 is formed, for example, in a rectangular shape that is long in one direction (X-direction). On the front surface 115, a third electrode portion 1183 which is a part of the plurality of individual electrodes 118 and a third electrode portion 1193 which is a part of the single common electrode 119 are formed. The pair of actuators 113 are provided on the front surface 115, aligned in a lateral direction (Y-direction) of the substrate 111. The substrate 111 includes a single supply port 1111, a plurality of discharge ports 1112 and a plurality of through-holes 1113. The supply port 1111, the discharge ports 1112, and the through-holes 1113 are holes penetrating the substrate 111. The supply port 1111 is an opening through which ink passes and is formed on the substrate 111.

On an end surface 1114 of the substrate 111 in a longitudinal direction, a fifth electrode portion 1195 which is a part of the single common electrode 119 is formed. The end surface 1114 extends in a thickness direction (Z-direction) of the substrate 111 and forms a side surface portion continuous with the front surface 115 which is the main surface on one side of the substrate 111 and the back surface 117 which is the main surface on the other side of the substrate 111.

The supply port 1111 is an inlet that supplies ink to the first common liquid chamber 1161. The supply port 1111 is a penetrating hole formed in the center of the substrate 111 in the lateral direction. The supply port 1111 extends along the longitudinal direction of the substrate 111. In other words, the supply port 1111 is a long hole or slot that is long in one direction along a longitudinal direction of the actuator 113 and the longitudinal direction of the first common liquid chamber 1161, for example. The supply port 1111 is provided between the pair of actuators 113 and opens at a position facing the first common liquid chamber 1161.

On the inner wall surface of the supply port 1111, a fourth electrode portion 1194, which is a part of the common electrode 119, is formed.

The discharge port 1112 is an outlet for discharging ink. A plurality of, for example, four discharge ports 1112 are provided. Each discharge port 1112 is, for example, between the first common liquid chamber 1161 and each second common liquid chamber 1162, and is adjacent to each of both end portions of the pair of actuators 113 in the longitudinal direction. The plurality of discharge ports 1112 may be provided in the second common liquid chambers 1162. On the inner wall surface of each of the discharge ports 1112, an eighth electrode portion 1198, which is a part of the common electrode 119, is formed.

The through-holes 1113 are the penetrating holes formed at both end portions of the substrate 111 in the longitudinal direction and outside the discharge ports 1112. The through-holes 1113 are provided outside the frame 112 and open at positions where the through-holes 1113 do not face the first common liquid chamber 1161 and the second common liquid chambers 1162. The through-holes 1113 do not generally come into contact with ink. On the inner wall surface of each through-hole 1113, a seventh electrode portion 1197, which is a part of the common electrode 119, is formed.

On the substrate 111, the actuators 113 and the frame 112 are provided. The inside of the frame 112 of the substrate 111 serves as a liquid contact region where ink is applied, and the outside of the frame 112 serves as a mounting region to which various electronic components can be connected.

The frame 112 is fixed to one main surface of the substrate 111 with an adhesive or the like. The frame 112 surrounds the supply port 1111, the plurality of discharge ports 1112 and the actuators 113 provided on the substrate 111.

For example, the frame 112 is formed in a rectangular frame shape, thereby forming an opening that is long in one direction along the longitudinal direction of the frame 112. The frame 112 may have a stage or stepped structure in which a part of the front surface thereof is recessed. The pair of actuators 113, the supply port 1111, and four discharge ports 1112 are disposed in the opening of the frame 112. The frame 112 surrounds the actuators 113 between the nozzle plate 114 and the substrate 111 and is configured to be able to hold the liquid inside.

The pair of actuators 113 are adhered to the front surface 115 of the substrate 111. The pair of actuators 113 are provided in two rows on the substrate 111 with the supply port 1111 interposed therebetween. The actuators 113 are formed in a plate shape that is long in one direction. The actuators 113 are disposed in the opening of the frame 112 and adhered to the front surface 115 of the substrate 111.

As illustrated in FIGS. 5 to 9, each actuator 113 includes a plurality of pressure chambers 1131 disposed at equal intervals in the longitudinal direction and with an air chamber 1132 disposed between adjacent pressure chambers 1131 in the longitudinal direction. The air chambers 1132 are disposed at equal intervals between each other in the longitudinal direction. In other words, the pressure chambers 1131 and air chambers 1132 are alternately disposed along the longitudinal direction in the actuators 113. The pressure chambers 1131 and the air chambers 1132 extend in a direction intersecting the alignment direction, for example, in a lateral direction of the actuator 113.

A top surface portion of each actuator 113, which is a surface opposite to the substrate 111, is adhered to the nozzle plate 114. The actuator 113 is formed with a plurality of grooves which are disposed to be aligned at equal intervals in the longitudinal direction, and are formed along a direction orthogonal to the longitudinal direction. The grooves form the plurality of pressure chambers 1131 and the plurality of air chambers 1132. In other words, each actuator 113 includes a plurality of piezoelectric bodies 1133, which are disposed at equal intervals in the longitudinal direction and are driving elements configuring walls (sidewalls) of the grooves. The plurality of piezoelectric bodies 1133 thus form the plurality of pressure chambers 1131 and the plurality of air chambers 1132. A driving voltage can be applied to the piezoelectric bodies 1133 to change the volume of the pressure chambers 1131.

The width of the actuator 113 in the lateral direction may, in some examples, gradually increase from a top side toward the substrate 111 side. A cross-sectional shape orthogonal to the longitudinal direction of the actuator 113 may be a trapezoidal shape. That is, the actuator 113 can have an inclined surface 1134. This side surface portion (inclined surface 1134) is disposed to face the first common liquid chamber 1161 and the second common liquid chambers 1162. On the inclined surface 1134, a second electrode portion 1182 (which is a part of an individual electrode 118) and a second electrode portion 1192 (which is a part of a common electrode 119) are formed.

As a specific example, the actuator 113 is formed of a stacked piezoelectric member obtained by adhering two sheets of rectangular plate-shaped piezoelectric materials that are long in one direction to be faced to each other so that polarization directions of the two sheets of rectangular plate-shaped piezoelectric materials are opposite to each other. Here, the piezoelectric material is lead zirconate titanate (PZT), for example. The actuator 113 is adhered to the front surface 115 of the substrate 111 by, for example, a thermosetting epoxy adhesive thermosetting. The inclined surface 1134 can be formed in the actuator 113 by, for example, a cutting process. In addition, the substrate 111 and the actuator 113 can be formed with polished surfaces obtained by polishing the front surface 115. The grooves of the actuator 113 can be formed by cutting an initially flat sheet of the material forming piezoelectric bodies (driving element) 1133.

In the actuator 113, a first electrode portion 1181 and a second electrode portion 1182 (which are a part of an individual electrode 118), and a first electrode portion 1191 and a second electrode portion 1192 (which are a part of a common electrode 119) are formed.

Each pressure chamber 1131 can cause ink to be discharged from the nozzle 1141 by being deformed during an operation such as printing by the liquid ejection head 1. An inlet of the pressure chamber 1131 opens to the first common liquid chamber 1161 and an outlet of the pressure chamber 1131 opens to the second common liquid chamber 1162. Ink flows into the pressure chamber 1131 from the inlet and flows out from the outlet. In other examples, each pressure chamber 1131 may have a configuration in which ink flows in from both openings presently described as the inlet and the outlet. In the grooves configuring the pressure chambers 1131, the first electrode portions 1181 are respectively formed.

As illustrated in FIG. 9, each air chamber 1132 is separated from the first common liquid chamber 1161 and the second common liquid chambers 1162 by a blocking of the inlet side and the outlet side with a liquid-proof wall 1135. The liquid-proof wall 1135 can be made of photosensitive resin or the like. As a specific example, the liquid-proof wall 1135 of an air chamber 1132 is formed by injecting an ultraviolet curable resin into the groove forming the air chamber 1132 and then irradiating necessary portions such as both end portions, which are the inlet side and outlet side of the groove, with ultraviolet rays using an exposure mask or the like. Such a liquid-proof wall 1135 prevents ink from entering the air chamber 1132. The upper side of the air chamber 1132 is blocked by the nozzle plate 114 without a nozzle 1141 being provided for the air chamber 1132. Therefore, ink can not flow into the air chamber 1132. Inside the air chamber 1132, the first electrode portion 1191 is formed.

The nozzle plate 114 is formed in a plate shape. The nozzle plate 114 is fixed to the main surface of the frame 112 opposite to the substrate 111 with an adhesive or the like. The nozzle plate 114 includes the plurality of nozzles 1141 formed at positions facing the plurality of pressure chambers 1131. In this embodiment, the nozzle plate 114 has two nozzle rows 1142 in which a plurality of nozzles 1141 are aligned in one direction.

The first common liquid chamber 1161 is formed between the pair of actuators 113 excluding both end portions. The first common liquid chamber 1161 functions as part of an ink channel from the supply port 1111 to the openings (inlets) on the primary side of the plurality of pressure chambers 1131 of each actuator 113. The first common liquid chamber 1161 extends along the longitudinal direction of the actuator 113.

Each second common liquid chambers 1162 is formed between one actuator 113 and the frame 112, respectively. The second common liquid chambers 1162 form ink channels from the openings (outlets) on the secondary side of the plurality of pressure chambers 1131 to the discharge ports 1112. The second common liquid chambers 1162 extend along the longitudinal direction of the actuator 113.

The plurality of individual electrodes 118 individually apply drive voltages to the piezoelectric bodies 1133 to individually deform the pressure chambers 1131 to permit selective ejection of liquid from the corresponding nozzle 1141. The individual electrodes 118 are formed by a wiring pattern formed on the substrate 111 and a wiring pattern formed on the actuator 113. Each individual electrode 118 is drawn out from one of the pressure chambers 1131 and an air chamber 1132 on one side in the extending direction. In this embodiment, each individual electrode 118 is drawn out from a pressure chamber 1131 to a region outside the pair of actuators 113.

As a specific example, as illustrated in FIGS. 7 to 9, the plurality of individual electrodes 118 are deposited on the inner surfaces of the pressure chambers 1131, the inclined surfaces 1134 of the actuator 113, and the substrate 111. Specifically, each individual electrode 118 is formed on the side surfaces of the piezoelectric body 1133 configuring the pressure chamber 1131 and a part of the piezoelectric member configuring a bottom of the pressure chamber 1131. Each individual electrode 118 is formed, for example, on an inclined surface 1134 and the front surface 115 of the substrate 111. Each individual electrode 118 extends from the inside of a pressure chamber 1131 to an end portion of the substrate 111 in the lateral direction, and an end portion of the individual electrode 118 is disposed at a connection portion 1116 to which the circuit board 14 of the substrate 111 is connected. That is, each individual electrode 118 includes a first electrode portion 1181 formed in the groove that configures the pressure chamber 1131 of the actuator 113, a second electrode portion 1182 formed on the inclined surface 1134 of the actuator 113, and a third electrode portion 1183 formed on the front surface 115 of the substrate 111. The individual electrodes 118 are provided so as to be in close contact with the front surface of the piezoelectric member forming the bottom of the pressure chamber 1131 and the piezoelectric body 1133. The individual electrode 118 is formed by, for example, a nickel thin film. The individual electrodes 118 are not limited to a nickel thin film, and may be formed by, for example, a thin film of gold or copper. The thickness of each individual electrode 118 is, for example, 0.5 μm to 5 μm.

The common electrode 119 applies the same drive voltage to all of a plurality of piezoelectric bodies 1133. The common electrode 119 is formed by a wiring pattern formed on the substrate 111 and a wiring pattern formed on the actuator 113. The common electrode 119 is a wiring pattern provided from an inner peripheral surface of the supply port 1111 of the substrate 111 to the piezoelectric bodies 1133 forming the plurality of air chambers 1132. The common electrode 119 is connected to the circuit board 14. The common electrode 119 is drawn out to the other side of the pressure chamber 1131 from the individual electrode 118. In this embodiment, the common electrode 119 is drawn out from the air chamber 1132 to the region between the pair of actuators 113. In other words, the common electrode 119 is formed by bundling the electrodes of the plurality of air chambers 1132 in the middle of the substrate.

As a specific example, as illustrated in FIGS. 7 to 9, the common electrode 119 is deposited on the inner surface of each air chamber 1132 and the inclined surfaces 1134 of the actuator 113. The common electrode 119 is formed so as to be on a region that is outside the individual electrode 118 on the substrate 111. That is, common electrode 119 avoids the individual electrodes 118. The common electrode 119 is formed on the side surface of the piezoelectric body 1133 that forms each air chamber 1132 and a part of the piezoelectric member that configures a bottom of the air chamber 1132. The common electrode 119 is provided on the inclined surface 1134 from the inside of each air chamber 1132 toward the central (middle) portion of the substrate 111, and is formed on the front surface 115 of the substrate 111 between the pair of actuators 113 and on the inner peripheral surface of the supply port 1111. The common electrode 119 extends to the end portion of the substrate 111 in the lateral direction and is also formed on the end surface 1114 of the substrate 111 in the lateral direction (Y-direction) and the back surface 117 which is the main surface opposite to the front surface 115 of the substrate 111. For example, the common electrode 119 extends to the end portion of the substrate 111 in the lateral direction, and an end portion of the common electrode 119 is disposed at the connection portion 1116 to which the circuit board 14 of the substrate 111 is connected.

In other words, the common electrode 119 is provided in the middle of the substrate 111 between the pair of actuators 113 to the connection portion 1116 formed at the end portion of the substrate 111. As illustrated in FIG. 7, a part of the common electrode 119 is provided on the inner peripheral surface of the supply port 1111 so as to extend in the thickness direction of the substrate 111. A part of the common electrode 119 is provided on the front surface of the piezoelectric member forming each air chamber 1132. Furthermore, a part of the common electrode 119 is provided on the end surface 1114 of the substrate 111 and the back surface 117 of the substrate 111.

That is, the common electrode 119 includes a first electrode portion 1191 formed in the grooves that configure the air chambers 1132 of the actuator 113, a second electrode portion 1192 formed on the inclined surfaces 1134 of the actuator 113, a third electrode portion 1193 formed on the front surface 115 of the substrate 111, a fourth electrode portion 1194 formed on the inner peripheral surface of the supply port 1111, a fifth electrode portion 1195 formed on the end surfaces 1114 of the substrate 111, a sixth electrode portion 1196 formed on the back surface 117 of the substrate 111, a seventh electrode portion 1197 formed on the inner peripheral surface of the through-hole 1113, and an eighth electrode portion 1198 formed on an inner peripheral surface of the discharge port 1112. The electrode portions 1191 to 1198 of the common electrode 119 avoid the individual electrode 118 and other mounting components. The electrode portions 1191 to 1198 of the common electrode 119 may be partially formed on the surface of the substrate 111 or the actuator 113 in some examples.

In the common electrode 119, the third electrode portion 1193 (on the front surface 115 of the substrate 111) and the sixth electrode portion 1196 (on the back surface 117) are connected by the fourth electrode portion 1194 (in the supply port 1111), the fifth electrode portion 1195 (at the end surface 1114), the seventh electrode portion 1197 (at the through-hole 1113), and the eighth electrode portion 1198 (in the discharge port 1112).

The common electrode 119 is provided so as to be in close contact with the front surface of the piezoelectric member that forms the bottom of each air chamber 1132 and each piezoelectric body 1133. The common electrode 119 is formed by, for example, a nickel thin film. The common electrode 119 is not limited to the nickel thin film, and may be formed by, for example, a thin film of gold or copper. The thickness of the common electrode 119 is, for example, 0.5 μm to 5 μm.

For example, the individual electrodes 118 and the common electrode 119 are covered by a coating layer 120 inside the frame 112. The individual electrodes 118 may be covered with an adhesive that adheres the frame 112 to the substrate 111 on the bottom surface of the frame 112.

The coating layer 120 is formed on the front surface of the actuator 113 and the front surface 115 of the substrate 111 in the region within the frame 112. The coating layer 120 covers the front surface 115 of the substrate 111 including a region where at least a part of the individual electrodes 118 and the common electrode 119 are formed. The coating layer 120 is a film formed by, for example, a spray method, and is formed of, for example, a thermosetting epoxy adhesive. For example, the thickness of the coating layer 120 is 5 μm to 30 μm. The coating layer 120 covers the inclined surfaces 1134 of the actuator 113 and a part of the front surface 115 of the substrate 111. As an example, the coating layer 120 is formed on the front surface 115 of the substrate 111 at least in a region surrounded by the frame 112. For example, the coating layer 120 is formed in a region on the inner peripheral side of the frame 112 and a region immediately below the frame 112. In other words, the coating layer 120 is not formed on a mounting region outside the frame 112 on the front surface 115 or on the back surface 117.

The coating layer 120 is formed, for example, by first installing or forming the actuators 113 on the substrate 111 and then applying a coating agent by a spray method after forming the electrodes.

As illustrated in FIGS. 1, 4, and 5, the manifold unit 12 includes a manifold 121, a top plate 122, ink supply pipes 123, ink discharge pipes 124, and a cooling water supply pipe 125 and a cooling water discharge pipe 126, which are a pair of temperature control pipes. The number of ink supply pipes 123, ink discharge pipes 124, cooling water supply pipes 125, and cooling water discharge pipes 126 can be appropriately set or varied according to different embodiments.

The manifold 121 is formed in a plate shape or a block shape. As illustrated in FIG. 5, the manifold 121 includes a supply channel 1211 that is continuous with the supply port 1111 of the substrate 111 and forms a liquid supply channel, a discharge channel that is continuous with the discharge port 1112 of the substrate 111 and forms a liquid discharge channel, and a first cooling channel 1213 that forms a fluid channel for cooling. Since the manifold 121 is connected to a pair of head bodies 11, the manifold 121 includes a pair of supply channels 1211 and a pair of discharge channels.

The manifold 121 is formed, for example, by assembling a plurality of manifold members to form the supply channel 1211, the discharge channel, and the first cooling channel 1213. One main surface of the manifold 121 is fixed to the back surface 117 of the substrate 111. The top plate 122 is fixed to the main surface of the manifold 121 opposite to the main surface to which the substrate 111 is fixed. For example, the ink supply pipes 123, the ink discharge pipes 124, the cooling water supply pipe 125, and the cooling water discharge pipe 126 are fixed to the manifold 121 through the top plate 122.

The supply channel 1211 is a channel formed in the manifold 121 by a hole or a groove. The supply channel 1211 fluidly connects the ink supply pipe 123 and the supply port 1111 of the substrate 111.

The discharge channel is a channel formed in the manifold 121 by a hole or a groove. The discharge channel fluidly connects the ink discharge pipe 124 and the discharge port 1112 of the substrate 111.

The first cooling channel 1213 is a channel formed in the manifold 121 by a hole or a groove. The first cooling channel 1213 fluidly connects the cooling water supply pipe 125 and the cooling water discharge pipe 126.

Both end portions of the first cooling channel 1213 are openings connected to the cooling water supply pipe 125 and the cooling water discharge pipe 126 provided on one main surface of the manifold 121. The first cooling channel 1213 is formed to be able to exchange heat with the substrate 111 fixed to the manifold 121.

The top plate 122 is provided on the surface of the manifold 121 opposite to the surface on which the substrate 111 is provided. The top plate 122 seals the supply channel 1211, the discharge channel, and the first cooling channel 1213 by covering the manifold 121.

The top plate 122 also has openings that connect the pipes 123, 124, 125 and 126 and allow the pipes 123, 124, 125 and 126 and the channels 1211 and 1213 to communicate with each other.

The ink supply pipe 123 is connected to the supply channel 1211. The ink discharge pipe 124 is connected to the discharge channel. The cooling water supply pipe 125 and the cooling water discharge pipe 126 are connected to the primary side and the secondary side of the first cooling channel 1213.

In this example embodiment, a pair of ink supply pipes 123 and the first cooling water discharge pipe 126 are disposed on one end side of the manifold 121, and a pair of ink discharge pipes 124 and the first cooling water supply pipe 125 are disposed on the other end side of the manifold 121.

The cooling channel unit 13 includes a plurality of second cooling channels 1312, a second cooling water supply pipe 133, and a second cooling water discharge pipe 134. A plurality of openings 1314 are formed between the plurality of second cooling channels 1312 in the cooling channel unit 13. The cooling channel unit 13 is connected to the cooling apparatus 2116 of the liquid ejection apparatus 2. The second cooling channels 1312 are long in one direction and aligned in a direction orthogonal to the longitudinal direction of the second cooling channels 1312. As a specific example, there are four nozzle rows 1142 and four actuators 113 (four rows), and four driver ICs 142 (four rows) are provided. Therefore, the cooling channel unit 13 includes three second cooling channels 1312 and two openings 1314 are formed between the second cooling channels 1312.

The plurality of second cooling channels 1312 are connected to the second cooling water supply pipe 133 and the second cooling water discharge pipe 134.

In the cooling channel unit 13, a part of the driver IC 142 and a printed wiring board 143 of the circuit board 14 are disposed in the plurality of openings 1314, and the plurality of second cooling channels 1312 are disposed to face the driver IC 142 (which generates heat during operation) so that the driver IC 142 can be cooled.

As illustrated in FIG. 4, the circuit board 14 includes the driver IC 142, of which one end is connected to the connection portion 1116 of the substrate 111, and the printed wiring board 143.

The circuit board 14 drives the actuator 113 by applying a driving voltage to the wiring pattern of the actuator 113 from the driver IC 142 to increase or decrease the volume of the pressure chamber 1131 and eject droplets from the nozzle(s) 1141.

The driver IC 142 is connected to the plurality of individual electrodes 118 and the common electrode 119 through an anisotropic conductive film (ACF) or the like that is fixed to the connection portion of the substrate 111 by thermo-compression bonding or the like. The driver IC 142 may be connected to the plurality of individual electrodes 118 and the common electrode 119 by other means such as an anisotropic conductive paste (ACP), a non-conductive film (NCF), and a non-conductive paste (NCP). A plurality of driver ICs 142 to be connected are provided for one head body 11, for example. In this embodiment, two driver ICs 142 are coupled to one actuator 113. The driver IC 142 is, for example, a chip on film (COF) design on which a driver IC chip is mounted on film-like substrate.

The front surface of the driver IC 142 contacts an outer surface of the second cooling channel 1312.

The printed wiring board 143 is a printing wiring assembly (PWA) on which various electronic components and connectors are mounted.

The cover 15 includes, for example, an outer shell body 151 that covers the side surfaces of the pair of head bodies 11, the manifold unit 12, and the circuit board 14, and a mask plate 152 that covers a part of the pair of head bodies 11 on the nozzle plate 114 side.

The outer shell body 151 exposes, for example, the ink supply pipes 123, the ink discharge pipes 124, the cooling water supply pipe 125, the cooling water discharge pipe 126 of the manifold unit 12, and an end portion of the circuit board 14 to the outside.

The mask plate 152 covers parts of the pair of head bodies 11 excluding the plurality of nozzles 1141 and the periphery of the plurality of nozzles 1141 of the nozzle plate 114.

The liquid ejection head 1 configured in this way includes the plurality of individual electrodes 118 capable of individually applying a driving voltage to each of the piezoelectric bodies 1133 and the common electrode 119 capable of applying the driving voltage to all the piezoelectric bodies 1133 in the head body 11.

Therefore, the liquid ejection head 1 can selectively drive the plurality of pressure chambers 1131. When each pressure chamber 1131 is driven, the driven pressure chamber 1131 is subjected to shear mode deformation, and the ink in the pressure chamber 1131 is pressurized. Therefore, the liquid ejection head 1 can selectively eject ink from the nozzles 1141 connected to the pressure chambers 1131.

In addition to the front surface 115 of the actuator 113 of the substrate 111, the inclined surfaces 1134 of the actuator 113, and the inner surface of the air chamber 1132, the common electrode 119 can also be formed on the inner peripheral surface of the supply port 1111 formed on the substrate 111.

Hereinafter, the inkjet recording apparatus 2 including the liquid ejection head 1 will be described with reference to FIG. 10. The inkjet recording apparatus 2 includes a casing 2111 (housing), a medium supply unit 2112 (e.g., a paper feeding cassette), an image forming unit 2113, a medium discharge unit 2114 (e.g., a sheet tray), a conveyance device 2115 (e.g., a sheet conveyance mechanism), a maintenance device 2117, and a control unit 2118. The inkjet recording apparatus 2 also includes a cooling apparatus that adjusts the temperature of ink supplied to the liquid ejection head 1.

The inkjet recording apparatus 2 is an inkjet printer that prints text and/or images on paper P by ejecting ink onto the paper P while paper P is being conveyed along a predetermined conveyance path 2001 from the medium supply unit 2112 to the medium discharge unit 2114 passing through the image forming unit 2113.

The media supply unit 2112 includes a plurality of paper feed cassettes 21121. The image forming unit 2113 includes a support unit 2120 that supports paper thereon or therein, and a plurality of head units 2130 disposed above the support unit 2120. The medium discharge unit 2114 includes a paper discharge tray 21141.

The support unit 2120 in this example comprises a conveyance belt 21201 provided in a loop shape, a support plate 21202 supporting the conveyance belt 21201 from a back side in a predetermined region for image formation, and a plurality of belt rollers 21203 provided on the back side of the conveyance belt 21201.

The head units 2130 each include a liquid ejection head 1, a supply tank 2132 connected to the liquid ejection head 1, a pump 2134 for supplying ink from the supply tank 2132 to the liquid ejection head 1, and connection channels 2135 that connect the liquid ejection head 1 and the supply tank 2132.

In this embodiment, liquid ejection heads 1 for four ink colors of cyan, magenta, yellow, and black are provided, and likewise the supply tanks 2132 for four colors are provided.

The pump 2134 is, for example, a liquid feed pump configured with a piezoelectric pump. The pump 2134 is connected to the control unit 2118 and driven and controlled by the control unit 2118.

The connection channel 2135 includes a supply channel connected to the ink supply pipe 123 of the liquid ejection head 1. The connection channel 2135 includes a recovery channel connected to the ink discharge pipe 124 of the liquid ejection head 1. For example, if the liquid ejection head 1 is a non-circulation type head, the recovery channel is connected to the maintenance device 2117, and if the liquid ejection head 1 is of a circulation type head, the recovery channel is connected to the supply tank 2132.

The conveyance device 2115 conveys paper P along the conveyance path 2001 from a paper feed cassette 21121 of the medium supply unit 2112 to the discharge tray 21141 of the medium discharge unit 2114 through the image forming unit 2113. The conveyance device 2115 includes a plurality of guide plate pairs 21211 to 21218 and a plurality of conveyance rollers 21221 to 21228 disposed along the conveyance path 2001. The conveyance device 2115 supports paper P so as to be movable relative to the liquid ejection head 1.

The cooling apparatus 2116 includes a cooling water tank 21161, a cooling channel circuit 21162 such as pipes and tubes that supply cooling water, a pump that supplies cooling water, a cooling device that adjusts the temperature of the cooling water, and the like. The cooling apparatus 2116 supplies the cooling water in the cooling water tank 21161 adjusted to a predetermined temperature by the cooling device to the second cooling water supply pipe 133 through the cooling circuit 21162 by feeding water from the pump. The cooling apparatus 2116 recovers the water discharged from the second cooling water discharge pipe 134 through the first cooling channel 1213 and the second cooling channel 1312 to the cooling water tank 21161 through the cooling circuit 21162. The cooling device is, for example, a cooler.

The maintenance device 2117, for example, during a maintenance operation, suctions and recovers ink left on the outer surface of the nozzle plate 114. If the liquid ejection head 1 is of the non-circulation type head, the maintenance device 2117 may also recover the ink left inside the head body 11 during the maintenance operation. Such a maintenance device 2117 includes trays, tanks, or the like for storing recovered ink.

The control unit 2118 includes a CPU 21181 as an example of a processor, a memory such as, a read only memory (ROM) that stores various programs, and the like, and a random access memory (RAM) that temporarily stores various variable data, parameters, image data, and the like, and an interface unit for receiving data from the outside and outputting data to the outside.

A liquid ejection head 1 and the inkjet recording apparatus 2 configured as described above can provide high print quality since the common electrode 119 is formed on the end surface 1114 of the substrate 111. That is, since the electrode portions 1193 and 1196 on the front surface 115 side and the back surface 117 side of the substrate 111 are connected by the electrode portion 1195 on the end surface 1114, even if ink containing a component that might dissolve the electrode material is being used, the connective area of the common electrode 119 can still be secured indefinitely. For example, if the coating layer 120 is not formed on the back surface 117 of the substrate 111, then even if a part of the common electrode 119 on the back surface 117 of the substrate 111 erodes around the supply port 1111, an increase in the resistance of the common electrode 119 can be avoided by providing the connection between the common electrodes 119 on the front surface 115 and the back surface 117 via the electrode portion 1195 formed on the end surface 1114, which is outside the region in contact with the ink. Therefore, it is possible to prevent the occurrence of differences in the drive waveform between the end portion and the central portion within the row, and to maintain good print quality such as dot diameter and linearity.

In the liquid ejection head 1, by providing the common electrode 119 also on the inner peripheral surface of the supply port 1111, an electrode surface area of the common electrode 119 can be secured, and the resistance of the common electrode 119 can be reduced. Therefore, even if the row spacing of the piezoelectric bodies 1133 of the actuator 113 is narrowed, it is possible to prevent a difference in ejection performance between the central side and the end portion side in the direction in which the nozzles 1141 of the head body 11 are aligned.

In an embodiment described above, the common electrode 119 (or a part thereof) is also provided in the through-hole 1113, which is formed outside the frame 112, and is not in contact with ink, and the connection of the common electrode 119 between the front surface 115 and the back surface 117 can be ensured through the through-hole 1113, and thus the resistance of the common electrode 119 can be reduced.

Embodiments are not limited to those example configurations specifically described above. In one embodiment, the supply port 1111, which is a long hole, is disposed between the pair of actuators 113, and the discharge ports 1112 are disposed at both ends of the pair of actuators 113 in the longitudinal direction with the through-holes 1113 disposed at the outer end sides. However, in other examples, the shape, number, and disposition of the supply ports 1111, the discharge ports 1112, and the through-holes 1113 can be appropriately set or varied. For example, a configuration in which the common electrode 119 is not formed on the inner peripheral surface of the discharge port 1112 may be adopted. Alternatively, a configuration without a through-hole 1113 may be adopted. Even in such a configuration, a connection state of the common electrode 119 can still be maintained by forming the electrode on the end surface 1114.

In an embodiment, individual electrodes 118 are formed in the pressure chambers 1131 and the common electrode 119 is formed in the air chambers 1132, but in other examples the common electrode 119 can be formed in the pressure chambers 1131 and the individual electrodes 118 can be formed in the air chamber 1132.

In embodiment, the liquid ejection head 1 includes a pair of head bodies 11, but examples are not limited thereto. The liquid ejection head 1 include one head body 11 in some examples. In an example, a head body 11 includes a pair of actuators 113, but in other examples the head body 11 might include just one actuator 113.

In some examples, a configuration in which an orifice (opening) is provided at the inlet and outlet of the pressure chambers 1131 may be adopted. For example, in a liquid ejection head of another embodiment, the pressure chamber 1131 may have a constricted part that narrows the channel may be formed at the inlet that opens to the first common liquid chamber 1161 and the outlet that opens to the second common liquid chamber 1162. The constricted part is, for example, a protrusion or a wall-like member that is formed of an ultraviolet curable resin and blocks a part of the inlet and outlet, and functions to increase the channel flow resistance at the inlet and outlet of the pressure chamber 1131.

The liquid ejection head 1 of one embodiment is of a non-circulation type. In other examples, the liquid ejection head 1 may be of a circulation type.

In an embodiment, an inkjet head in which one side of the pressure chamber 1131 is the supply side and the other side is the discharge side, and ink flows in from one side of the pressure chamber 1131 and flows out from the other side thereof is exemplified, but is not limited thereto. For example, a configuration in which ink flows in from both sides (ends) of the pressure chamber 1131 may be adopted. In other examples, the supply side and the discharge side may be reversed from the described embodiment, or may be configured to be switchable.

In an embodiment, a side shooter type ink jet head is exemplified, but examples are not limited thereto. In other examples, an edge shooter type ink jet head may be adopted.

The liquid to be ejected is not limited to ink for printing purposes. For example, a liquid containing conductive particles for forming a wiring pattern of a printed wiring board may be used.

In an embodiment, an inkjet printer for printing on paper or the like is exemplified, but examples are not limited thereto. Embodiments in other examples may be a 3D printer, an industrial manufacturing machine, and a medical research appliance. Such examples can be made smaller, more reliable, lighter, and less expensive by adoption of the described concepts.

According to at least one embodiment described above, since the common electrode is formed on the end surface of the substrate, high print quality can be ensured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a substrate;

an actuator on a first surface side of the substrate, the actuator including a plurality of pressure chambers and a plurality of air chambers, each air chamber of the plurality being between an otherwise adjacent pair of pressure chambers in the plurality of pressure chambers, each pressure chamber being connected to an opening in the substrate extending from a second surface side of the substrate to the pressure chamber;

a manifold on the second surface side of the substrate and connected to the opening in the substrate;

a common electrode including a portion on a front surface of the actuator, a portion on a first surface of the substrate on the first surface side of the substrate, a portion on a second surface on the second surface side of the substrate, a portion on an inner sidewall surface of the opening, and a portion on a side surface of the substrate;

a plurality of individual electrodes each including a portion on the front surface of the actuator and a portion on the first surface of the substrate;

a coating layer on the first surface side of the substrate and covering at least a part of the first surface of the substrate;

a frame member surrounding the actuator on the first surface side of the substrate; and a nozzle plate including nozzles fluidly connected to the pressure chambers, wherein the frame member is between the nozzle plate and the substrate.

2. The liquid ejection head according to claim 1, wherein the side surface of the substrate is outside the frame member.

3. The liquid ejection head according to claim 1, wherein the inner peripheral sidewall surface of the opening is continuous with the first surface and the second surface, and the manifold includes a fluid supply channel communicating with the opening.

4. The liquid ejection head according to claim 3, wherein the opening is a slot-shaped holed extending longitudinally along a length direction of the substrate.

5. The liquid ejection head according to claim 3, wherein the opening is a supply port.

6. The liquid ejection head according to claim 1, further comprising:

a discharge port that penetrates the substrate; and a through-hole that penetrates the substrate at a position outside the frame member, wherein the common electrode further includes at least one of a portion on an inner wall of the through-hole or a portion on an inner wall of the discharge port.

7. The liquid ejection head according to claim 1, wherein the actuator comprises piezoelectric members.

8. The liquid ejection head according to claim 1, wherein the common electrode comprises a nickel thin film.

9. The liquid ejection head according to claim 1, wherein the plurality of individual electrodes each comprise a nickel thin film.

10. A liquid ejection apparatus, comprising:

a liquid ejection head including:

a substrate;

an actuator on a first surface side of the substrate, the actuator including a plurality of pressure chambers and a plurality of air chambers, each air chamber of the plurality being between an otherwise adjacent pair of pressure chambers in the plurality of pressure chambers, each pressure chamber being connected to an opening in the substrate extending from a second surface side of the substrate to the pressure chamber;

a manifold on the second surface side of the substrate and connected to the openings in the substrate;

a common electrode including a portion on a front surface of the actuator, a portion on a first surface of the substrate on the first surface side of the substrate, a portion on a second surface on the second surface side of the substrate, a portion on an inner sidewall surface of the opening, and a portion on a side surface of the substrate;

a plurality of individual electrodes each including a portion on the front surface of the actuator and a portion on the first surface of the substrate;

a coating layer on the first surface side of the substrate and covering at least a part of the first surface of the substrate;

a frame member surrounding the actuator on the first surface side of the substrate; and a nozzle plate including nozzles fluidly connected to the pressure chambers, wherein the frame member is between the nozzle plate and the substrate.

11. The liquid ejection apparatus according to claim 10, further comprising:

a discharge port that penetrates the substrate; and a through-hole that penetrates the substrate at a position outside the frame member, wherein the common electrode further includes at least one of a portion on an inner wall of the through-hole or a portion on an inner wall of the discharge port.

* * * * *